US008444759B2

(12) United States Patent
Wen et al.

(10) Patent No.: US 8,444,759 B2
(45) Date of Patent: *May 21, 2013

(54) BIO-BASED ADHESIVE MATERIAL

(75) Inventors: Ben Wen, Horseheads, NY (US); Jessica P. Zhang, Horseheads, NY (US)

(73) Assignee: United Environment & Energy LLC, Horseheads, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/178,725

(22) Filed: Jul. 8, 2011

(65) Prior Publication Data

US 2011/0259239 A1    Oct. 27, 2011

Related U.S. Application Data

(63) Continuation-in-part of application No. 13/031,480, filed on Feb. 21, 2011, which is a continuation of application No. PCT/US2011/022813, filed on Jan. 28, 2011, which is a continuation-in-part of application No. 12/754,236, filed on Apr. 5, 2010, now Pat. No. 7,951,417.

(51) Int. Cl.
*B05D 1/12*    (2006.01)
(52) U.S. Cl.
USPC .......................... 106/246; 427/186; 427/188
(58) Field of Classification Search
USPC ............................................ 106/244; 260/75
See application file for complete search history.

(56) References Cited

U.S. PATENT DOCUMENTS

| 1,611,784 | A | 12/1926 | Schmitte |
| 2,673,814 | A | 3/1954 | MacLaren |
| 4,055,453 | A | 10/1977 | Tajima |
| 6,495,074 | B1 | 12/2002 | Carr |
| 2007/0087166 | A1 | 4/2007 | Lee et al. |
| 2008/0245269 | A1 * | 10/2008 | Forth et al. .................... 106/244 |

FOREIGN PATENT DOCUMENTS

| FR | 787.345 A | 9/1935 |
| WO | WO0174948 A1 | 10/2001 |
| WO | WO2008117077 A2 | 2/2008 |
| WO | WO2008/117077 | * 10/2008 |

OTHER PUBLICATIONS

Irene Gattinger, International Search Report on PCT/US2011/022813, European Patent Office. P.B. 5818 Patenllaan 2, NL—2280 HV Rijswijk, mailed May 24, 2011.

* cited by examiner

*Primary Examiner* — Melvin C Mayes
*Assistant Examiner* — Colette Nguyen
(74) *Attorney, Agent, or Firm* — Louis Ventre, Jr.

(57) ABSTRACT

A bio-based adhesive and method of making the adhesive replaces or serves as additives for asphalt, sealant, and polymers such as styrene-butadiene-styrene and atactic polypropylene in the manufacture of building or paving materials. The method includes steps of forming a mixture of oil comprising fatty acids group and optionally a powdered material; maintaining the oil-to-powdered-material weight ratio in the mixture between 1 to 0.00001 and 1 to 20; heating the mixture to a reaction temperature greater than 55 degrees Centigrade; maintaining the reaction temperature until the oil is polymerized; and, injecting air into the mixture while polymerizing the oil. The adhesive of this method comprises a renewable polymer and the powdered material.

14 Claims, 3 Drawing Sheets

| | |
|---|---|
| A method of making a bio-based adhesive for a coating or to replace or serve as an additive for asphalt, sealant, or polymers in manufacturing building or paving materials, the method comprising the steps of: 201 | |
| obtaining waste cooking oil for use as the oil in the mixture 405 | --- |
| selecting the powdered material from the group consisting of fly ash, sand, cement, limestone, clay, talc, mica, alumina oxide, dolomite, gypsum, wood flour, starch, and mixtures thereof 410 | --- |
| adding a catalyst to the mixture, the catalyst selected from the group consisting of cobalt, and an iron organic compound 415 | --- |
| obtaining the oil from a source selected from the group consisting of a plant, an alga, an animal fat, trap grease, a process of converting wood into wood pulp, and a process of destructive distillation from dried biomass 420 | --- |
| the reaction temperature is within a range of between about 130 degrees Centigrade and about 250 degrees Centigrade until the oil is polymerized 425 | --- |
| the period of time for maintaining the reaction temperature comprises about 0.5 hours to about 48 hours until the oil is polymerized 430 | --- |
| uniformly distributing the air in the mixture; and, maintaining an air to oil ratio in the mixture within a range of 0.01 to 2.0 liters of air per minute per gram of oil 435 | --- |
| stirring the mixture while polymerizing the oil 440 | --- |
| injecting air into the mixture is performed by bubbling air into the mixture 445 | --- |
| injecting air into the mixture is performed by rotating the mixture in a rotary drum 450 | --- |
| blending the bio-based adhesive with asphalt, a sealant, or a polymer 455 | --- |
| the polymer is selected from the group consisting of styrene-butadiene-styrene, and atactic polypropylene 460 | --- |

FIG.4

BIO-BASED ADHESIVE MATERIAL

CROSS-REFERENCE TO RELATED APPLICATIONS

This application is a continuation in part of U.S. application Ser. No. 13/031,480, filed 21 Feb. 2011,which is a continuation of International Application No. PCT/US2011/022813, filed 28 Jan. 2011, which claims the benefit of U.S. application Ser. No. 12/754,236, filed 5 Apr. 2011 and issued as U.S. Pat. No. 7,951,417 on 31 May 2011, which are all hereby incorporated by reference herein.

TECHNICAL FIELD

A method is disclosed for making a coating wherein the coating material is in the form of an encapsulation of powder in a polymerized oil and applying the coating material in superposed relationship on a base. The coating is a bio-based adhesive that is useful in a wide range of building or paving product manufactures, including but not limited to: a substitute for, or additive to, asphalt, sealant, or thermoplastic or elastomeric polymers such as styrene-butadiene-styrene and atactic polypropylene; and an ultra-violet-light-blocking coating.

BACKGROUND ART

Petroleum products are widely used in production of building and paving materials. Petroleum-based asphalt is used in road and other infrastructure construction. Asphalt is a complex heterogeneous mixture of hydrocarbons usually collected as a byproduct of the refining process of crude oil in petroleum refineries. Asphalt features low viscosity for mixing with aggregates and ease of compaction, and high viscosity at ambient temperature to provide stability of asphalt pavement. For roofing application, there are three basic types of roofing asphalt: coating-grade asphalt, mopping-grade asphalt, and saturant-grade asphalt, which are used for manufacturing asphalt, shingles, built-up roofing, and modified bitumen systems. On average, the asphalt industry produces approximately 38 million tons of asphalt annually.

Thermoplastic or elastomeric polymers, such as styrene-butadiene-styrene and atactic polypropylene, are used in modified asphalt as additives to improve the performance of asphalt.

A sealant is a viscous material that changes state to become solid after the application to close small openings or prevent the penetration of air or liquid. Most of sealant materials contain petroleum based products.

Petroleum asphalt and other petroleum based products contain both long-chain and short-chain molecules. In hot weather, heat promotes the diffusion of the lower molecular weight oils out of the bulk of the materials, causing thermal aging. The high temperature applications of petroleum asphalt generate hydrocarbon fumes, which irritate workers and create a nuisance for the surrounding community. The tight supply of asphalt along with the high cost of petroleum has pushed up the price of asphalt substantially.

The applications of styrene-butadiene-styrene, atactic polypropylene, and other polymers improve the asphalt properties for roofing and paving applications. However, these polymers are expensive and not renewable.

Production and use renewable material based polymers to replace petroleum based products for building and paving applications can reduce the use of petroleum and improve petroleum product performance, reduce volatile organic compounds emissions and greenhouse gas emissions, lower the material costs.

In the U.S, there are about 1.8 million tons of waste cooking oils, 5.4 million tons of animal fats, and 2.0 million tons of trap grease collected annually. The use of these recycled and renewable materials for bio-based adhesive material production to replace the petroleum products can serve important environmental and energy goals and at the same time provide useful products in modern society. This invention accomplishes this goal in providing durable building or paving products derived from renewable oil and a powdered material, which is preferably fly ash from coal-fired power plants.

SUMMARY OF INVENTION

A preferred method makes a bio-based adhesive used to replace or serve as an additive for asphalt, sealant, or polymers in the manufacture of building or paving materials. An exemplary use is as an adhesive material replacing asphalt in the manufacture of roof shingles or pavement.

This method includes a step of forming a mixture by combining: oil comprising fatty acids with a powdered material operable to facilitate polymerization of the oil. Used cooking oil is an example. A bio-based oil alone (without a powdered material) may be used because of particulate impurities present in such oil.

Oil having fatty acids may be obtained from various sources including a vegetable, a plant, an alga, an animal fat, trap grease, tall oil, pyrolysis oil and mixtures thereof. The method may include the step of obtaining waste cooking oil for use as the oil in the mixture.

The powdered material is preferably fly ash, sand, cement, limestone, clay, talc, mica, alumina oxide, dolomite, gypsum, wood flour, or starch, and mixtures thereof. In addition, the method may include a step of adding a catalyst to the mixture, such as cobalt, or an iron organic compound.

This method includes a step of maintaining the oil-to-powdered-material weight ratio in the mixture between 1 to 0.00001 and 1 to 20. Most applications will have an oil-to-powdered-material weight ratio in the mixture between 1 to 0.01 and 1 to 4.9.

This method includes a step of heating the oil or mixture to a reaction temperature greater than 55 degrees Centigrade. A variety of reaction temperatures are suitable for this process, but the method preferably sets the reaction temperature within a range of between about 55 degrees Centigrade and about 250 degrees Centigrade.

This method includes a step of maintaining the reaction temperature for the period of time required to polymerize the oil. This is typically longer than about five minutes and for most applications will be between 0.5 hours to 48 hours.

This method includes a step of injecting air into the mixture while polymerizing the oil. The method is preferably performed by uniformly distributing the air in the mixture and by maintaining an air to oil ratio in the mixture within a range of 0.01 to 2.0 liters of air per minute per gram of oil. Preferably, the step of injecting air is performed by bubbling air into the mixture, or rotating the mixture in a rotary drum.

This method may include a step of blending the bio-based adhesive with asphalt, a sealant, and a polymer, such as styrene-butadiene-styrene, and atactic polypropylene.

Technical Problem 1.8 million tons of waste cooking oils, 5.4 million tons of animal fats, and 2.0 million tons of trap grease are collected annually in the United States. However, these materials do not have the same properties as the petroleum products used in the building and paving industries, such as asphalt, sealant, and other polymers.

America's coal-fired power plants produce more than 71.1 million tons of fly ash annually, and approximately 60% is disposed of in landfills or surface impoundments.

Solution to Problem

An environmentally friendly and low cost bio-based adhesive material can be produced to replace or serve as additives for asphalt, sealant, and other polymers used in the building and paving industries. This adhesive material is manufactured from oils, such as oils from vegetable, plant, algae, animal fat, trap grease, preferably waste cooking oils, and from a powdered material, such as fly ash, sand, cements, limestone, clay, talc, mica, alumina oxide, dolomite, gypsum, wood flour, starch, and mixtures thereof, preferably fly ash.

Oils from vegetable or other plants, algae, animal fat, and trap grease contain unsaturated fatty acid chains. These unsaturated chains can be thermally polymerized. Heat can be used to accelerate the reaction. A catalyst can be used to promote the thermal polymerization of oils at lower temperature and fast rate.

Fly ash is recycled coal-fired power plant waste. Fly ash contains many metal compounds, such as $Fe2O3$ and $CaO$, which are possible catalysts for oil polymerization, which partially solves the liquid and viscosity problems.

This feature of fly ash, along with its fine particle size, makes fly ash a good candidate for combining the polymerized oil and fly ash to produce an adhesive material.

The powdered material may be used to facilitate or catalyze polymerization of the oils at certain temperatures. The polymerized oils then interact with the powdered material to produce an adhesive material. Thus, in a preferred embodiment, the powdered material is fly ash, which is a component of the adhesive material and may serve as a catalyst for the oil polymerization.

Advantageous Effects of Invention

A useful product can be made using two waste products: waste cooking oil and fly ash. Waste cooking oils are available at a relatively low cost. Waste cooking oil is both a renewable resource and a recyclable product. The fly ash is also available at low cost and using it for a manufactured product means less of it can serve as an environmental contaminant while at the same time changing a disposal liability to an asset with value.

This invention includes a novel bio-based renewable adhesive material. This material can replace or serve as an additive for the asphalt, sealant, polymers such as styrene-butadiene-styrene and atactic polypropylene used in the building or paving industries.

This adhesive material is manufactured using recycled agricultural byproducts, preferably waste cooking oils, and a powdered material, which is preferably recycled coal-fired power plant waste, fly ash. Waste cooking oil is both a renewable resource and a recycled product.

BRIEF DESCRIPTION OF DRAWING

The drawings illustrate preferred embodiments of the method of the invention. New reference numbers in FIG. 2 are given the 200 series numbers. Similarly, new reference numbers in each succeeding drawing are given a corresponding series number beginning with the figure number.

FIG. 4 illustrates optional additional steps in a method of making an adhesive for a coating or to replace or serve as an additive for asphalt, sealant, or polymers in the manufacture of building or paving materials.

DESCRIPTION OF EMBODIMENTS

Figure 1:
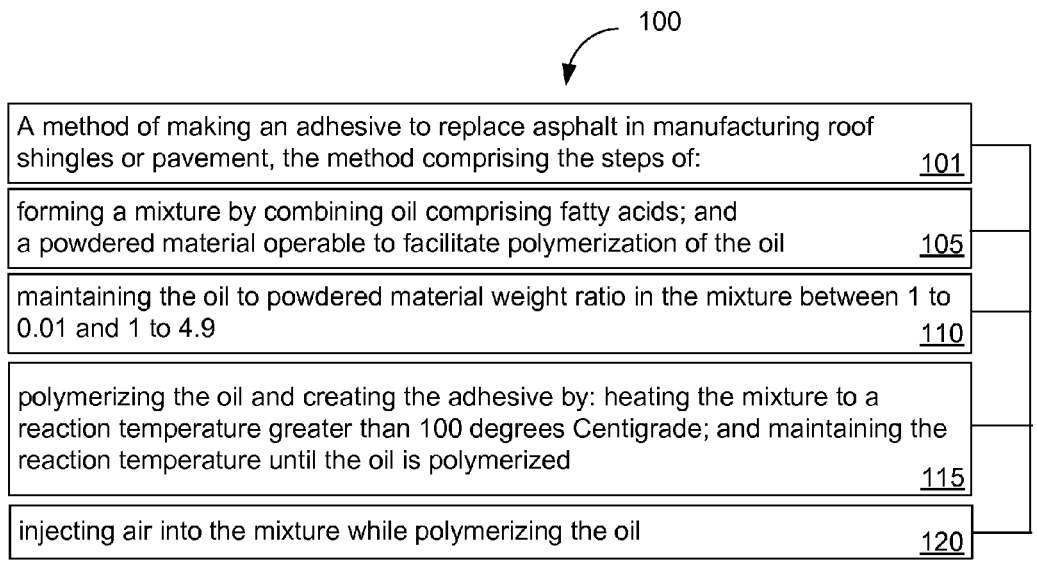
FIG. 1 illustrates a preferred method of making an adhesive to replace asphalt in the manufacture of roof shingles or pavement.

In the following description, reference is made to the accompanying drawing, which forms a part hereof and which illustrates several embodiments of the present invention. The drawing and the preferred embodiments of the invention are presented with the understanding that the present invention is susceptible of embodiments in many different forms and, therefore, other embodiments may be utilized, and operational changes may be made, without departing from the scope of the present invention. For example, the steps in the method of the invention may be performed in any order that results making or using the bio-based adhesive material.

Figure 2:
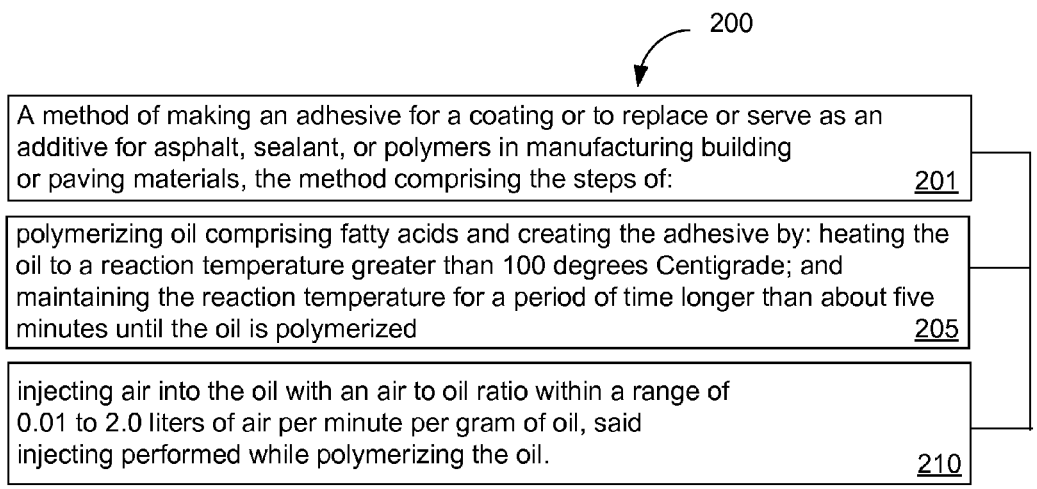
FIG. 2 illustrates a preferred method of making an adhesive for a coating or to replace or serve as an additive for asphalt, sealant, or polymers in the manufacture of building or paving materials.
Figure 3:
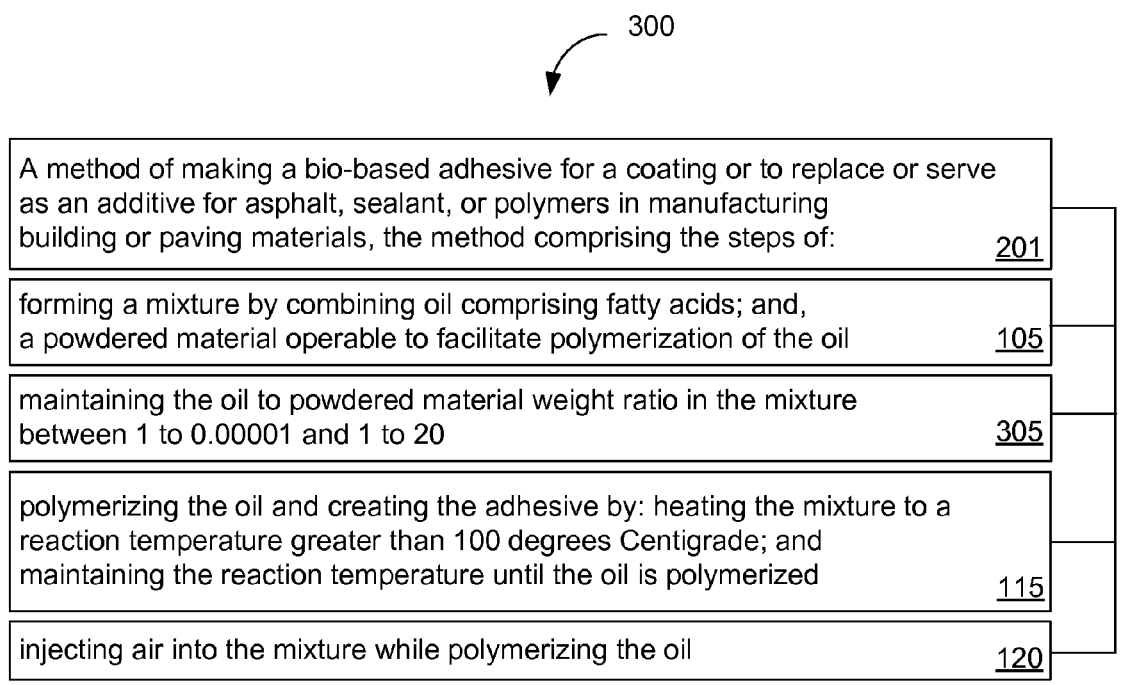
FIG. 3 illustrates an alternative preferred method of making an adhesive for a coating or to replace or serve as an additive for asphalt, sealant, or polymers in the manufacture of building or paving materials.

FIG. 1 illustrates a first method (100), FIG. 2 illustrates a second method (200) and FIG. 3 illustrates a third method (300), which are alternative preferred methods of making the bio-based adhesive that comprises a renewable polymer made from bio-based oil.

The first method (100) is a method of making an adhesive to replace asphalt in the manufacture of roof shingles or pavement, shown in FIG. 1, first-method preamble (101).

The second method (200) has more uses than the first method (100) and differs from the third method by the use of a bio-based oil without a powdered material additive. It is a method of making an adhesive for a coating or to replace or serve as an additive for asphalt, sealant, or polymers in the manufacture of building or paving materials, shown in FIG. 2, second-method preamble (201).

The third method (300) differs from the first method (100) in the oil-to-powdered-material weight ratio and the reaction temperature. It differs from the second method by the used of powdered material to create a mixture with the oil.

The adhesive resulting from the third method (300) encompasses more potential applications than the roof shingles or pavement of the first method (100). Like the second method (200), the third method (300) is also a method of making a bio-based adhesive for a coating or to replace or serve as an additive for asphalt, sealant, or polymers in the manufacture of building or paving materials, which is the same as second-method preamble (201).

The bio-based adhesive is also referred to herein as a coating, an adhesive or an adhesive material. Mandatory steps in these methods are connected by solid horizontal lines and optional steps shown in FIG. 4 are connected by dashed lines. The adhesive is bio-based because the oil employed in the method is biologically derived. Once the oil is polymerized in the method, the polymerized oil comprises a renewable polymer since the polymer is derived from a bio-based oil. The adhesive may be used to replace asphalt in the manufacture of roof shingles or pavement, as in the first method (100), or in both the second method (200) and the third method (300) for a coating or to replace or serve as an additive for asphalt, sealant, or polymers in the manufacture of building or paving materials.

A first-method first step (105) is forming a mixture by combining oil comprising fatty acids; and a powdered material that is operable to facilitate polymerization of the oil. This step is the same as the third-method first step and is given the same reference number in FIG. 3. The powdered material preferably interacts with the oil in facilitating the polymerization process. The powdered material also preferably interacts with polymerized oil to serve as a structural component of the resulting adhesive material.

The oil is preferably waste cooking oil containing unsaturated fatty acids. Therefore, an optional first step (405) in the method is obtaining waste cooking oil for use as the oil in the mixture. The optional steps in FIG. 4 may be used, mutatis mutandis, in any preferred or other embodiments of the invention.

While the recycling benefits in using waste cooking oil deliver extra environmental benefits, virgin or unused cooking oil may also be used. Any bio-derived oil comprising fatty acids may be used. This typically includes oil obtained from a vegetable or more generally a plant, an alga, an animal fat, trap grease, tall oil, pyrolysis oil and mixtures thereof.

Such bio-derived oils are well known, except perhaps tall oil and pyrolysis oil. Tall oil is a viscous yellow-black odorous liquid that is obtained as a by-product of the kraft process of converting wood into wood pulp. Pyrolysis oil is extracted in a biomass to liquid technology involving destructive distillation from dried biomass in a reactor.

Since any bio-derived oil may be used, the method optionally includes an optional fourth step (420) of a plant, an alga, an animal fat, trap grease, a process of converting wood into wood pulp, and a process of destructive distillation from dried biomass. These sources are all bio-based and their oils contain a certain amount of fatty acids groups necessary to implement the methods described herein.

Preferable powdered materials are fly ash, sand, cement, limestone, clay, talc, mica, alumina oxide, dolomite, gypsum, wood flour, starch, and mixtures thereof. These materials may reduce the amount of oil needed to make the bio-based adhesive and may enhance the performance of the bio-based adhesive material.

While the availability of bio-based oils may become limited in the future, it can be anticipated that there will always be a sufficient amount of fly ash available. The addition of the fly ash as the powdered material will enable the production of more bio-based adhesive material with the same amount of oils. For a shingle application, the addition of fly ash will also improve durability of the bioasphalt, such as penetration and softening point. Penetration is expressed as the distance in tenths of a millimeter that a standard needle vertically penetrates a sample of the material under known conditions of loading, time, and temperature. The softening point is the temperature at which a material softens beyond some arbitrary softness.

Thus, an optional second step (410) is selecting the powdered material from the group consisting of: fly ash, sand, cements, limestone, clay, talc, mica, alumina oxide, dolomite, gypsum, wood flour, starch, and mixtures thereof.

Fly ash is a waste product resulting from burning coal, typically in a coal-fired power plant. Fly ash in the mixture may catalyze polymerization of the oil at certain temperatures. The polymerized oil then interacts with the fly ash to produce the adhesive material. The fly ash serves as a component of the adhesive material. While fly ash is used as the primary example herein, any of the other powdered materials may serve the same functions.

Experimentation has shown that the bio-based adhesive could be produced from the waste cooking oils without the addition of fly ash or other powders and this is because of the impurities in the waste cooking oils. FIG. 2 illustrates this method.

Waste cooking oils and other oils typically contain impurities in powder form. The impurities in the waste cooking oils include food particles, crumbs, salt, seasonings, rubs, bone particles. Waste cooking oils also contain trace amounts of metal ions such as iron, copper and calcium, which can serve as catalysts for the polymerization process. These impurities present in the waste cooking oils, although in low concentration, facilitate the oil polymerization process. Even virgin soybean oil has impurities that produce the bio-based adhesive material without the addition of fly ash powder. Similarly, fresh vegetable oils also contain many oil-insoluble and oil-soluble impurities. The added fly ash or other powders facilitates the reaction and enables tuning the physical properties of the resulting product, enhancing its potential commercial uses. Without the addition of fly ash or other powder, the reaction still occurs, but is often impractical for commercial use, except when a less viscous adhesive is needed.

The adhesive resulting from the second method (200) illustrated in FIG. 2 will have a lower viscosity than the methods illustrated in first method (100) shown in FIG. 1 and third method (300) shown in FIG. 3 because the fly ash or other powder will be missing. However, when a thin adhesive is called for, such as in a coating or to replace or serve as an additive for asphalt, sealant or polymers, in the manufacture of building or paving materials, the viscous structure provided by the added powdered material can be counterproductive. When only oil is used, the same processing steps that would otherwise be used for the mixture of oil and powder also apply to the oil.

Accordingly, as illustrated in FIG. 2, this second method (200) includes: a second-method first step (205) of polymerizing oil comprising fatty acids and creating the adhesive by heating the oil to a reaction temperature greater than 100 degrees Centigrade and maintaining the reaction temperature for a period of time longer than about five minutes until the oil is polymerized; and a second-method third step (210) of injecting air into the oil with an air to oil ratio within a range of 0.01 to 2.0 liters of air per minute per gram of oil, said injecting performed while polymerizing the oil.

Metal catalysts, such as cobalt and iron organic compounds also may be added to further promote the reaction of oil polymerization. Thus, any of the embodiments may include an optional third step (415) of adding a catalyst to the mixture, the catalyst selected from the group consisting of cobalt, and an iron organic compound.

The first method (100) and the third method (300) include a first-method first step (105) of forming a mixture by combining oil comprising fatty acids; and, a powdered material operable to facilitate polymerization of the oil.

Fly ash by weight in the mixture can be as little as 0.00001 times the weight of the oil as high as 20 times the weight of the oil. Preferred mixtures for most building and paving uses employ a ratio by weight of oil to fly ash in a range of about twice as much oil as fly ash to about one-third as much oil as fly ash. In one embodiment, fly ash by weight in the mixture is as little as 0.01 times the weight of the oil to as high as 4.9 or roughly 5 times the weight of the oil. Typically, the higher the powdered material weight the more viscous the adhesive.

For roof shingles or pavement, the most common oil-to-powdered-material weight ratio in the mixture is between 1 to 0.01 and 1 to 4.9. Thus, the first method (100) includes a first-method second step (110) of maintaining the oil-to-powdered-material weight ratio in the mixture between 1 to 0.01 and 1 to 4.9. This step may also be present as an optional step in the second method (200). For the third method (300) involving coatings or to replace or serve as an additive for asphalt, sealant, or polymers in the manufacture of building or paving materials, the third-method second step (305) is maintaining the oil-to-powdered-material weight ratio in the mixture between 1 to 0.00001 and 1 to 20.

Generally, reaction temperatures should be greater than 55 degrees Centigrade. For many embodiments, the mixture is heated to a reaction temperature greater than 100 degrees Centigrade. The reaction temperature is preferably in a range of 130 degrees Centigrade and up to 250 degrees Centigrade. Generally and within this range, the higher the reaction temperature the faster the adhesive is made.

The reaction temperature must be held at the reaction temperature for a period of time needed to polymerize the oil in order to manufacture a useful adhesive. This period of time will vary and be as short as 5 minutes and as long as 48 hours. The holding time will vary depending on the reaction temperature. Typically, the holding time will be a period of time required to polymerize the oil to the extent required to deliver the final adhesive properties desired. In almost all cases, the holding time will be set for a period of time longer than about five minutes. A typical range for holding time for most mixtures will be about 5 hours up to about 48 hours, although holding times of 30 minutes (0.5 hours) can be utilized for some sealant and coating applications.

Accordingly: a first-method third step (115), which is the same as the third-method third step, is polymerizing the oil and creating the adhesive by: heating the mixture to a reaction temperature greater than 100 degrees Centigrade and maintaining the reaction temperature until the oil is polymerized; a second-method first step (205) is polymerizing oil comprising fatty acids and creating the adhesive by: heating the oil to a reaction temperature greater than 100 degrees Centigrade and maintaining the reaction temperature for a period of time longer than about five minutes until the oil is polymerized; and an optional fifth step (425) is maintaining the reaction temperature within a range of between about 130 degrees Centigrade and about 250 degrees Centigrade until the oil is polymerized. An optional sixth step (430) on the method confines the period of time for maintaining the reaction temperature to between about 0.5 hours to about 48 hours until the oil is polymerized.

The methods are best performed when air is added or injected into the oil or mixture as the oil is polymerizing. This is because increasing the oxygen content in the mixture results in a faster polymerization rate of the oil moles. Any adverse effects of humidity in the air have been found to be insignificant.

It is preferable to achieve a uniform distribution of air, and thus oxygen, in the oil or in the mixture while during the polymerizing step. It has been found that the air quantities can vary by a factor of a 200 or more and still achieve an acceptable adhesive. Acceptable operations may utilize as little as 0.01 liters of air per minute per gram of oil and as much as 2 liters of air per minute per gram of oil.

In addition to providing oxygen, air injection promotes stirring and uniformity of the mixture. The air can be injected at any time, that is, injecting air can be started as early as when the mixture is prepared, when heating is being applied, or as late as when the temperature reaches the reaction temperature. If injecting air when the temperature is at the reaction temperature, the reaction temperature will fluctuate for a short time and then become stabilized.

Accordingly, a first-method fourth step (120) and a third-method fourth step are injecting air into the mixture while polymerizing the oil; a second-method third step (210) is injecting air into the oil with an air to oil ratio within a range of 0.01 to 2.0 liters of air per minute per gram of oil, said injecting performed while polymerizing the oil.

It is also preferable to stir the mixture to promote formation of the adhesive. Accordingly: an optional seventh step (435) is uniformly distributing the air in the mixture; and, maintaining an air to oil ratio in the mixture within a range of 0.01 to 2.0 liters of air per minute per gram of oil; and an optional eighth step (440) is stirring the mixture while polymerizing the oil.

The above described goals of injecting air, doing it uniformly and to stirring, can be achieved by: bubbling air into the mixture; rotating the mixture in a rotary drum; or mechanically stirring using agitation.

Accordingly: an optional ninth step (445) is injecting air into the mixture is performed by bubbling air into the mixture; and an optional tenth step (450) is injecting air into the mixture is performed by rotating the mixture in a rotary drum.

The bio-based adhesive material disclosed herein can be used as a coating or to replace or blend with: asphalt; sealant; and a polymer such as styrene-butadiene-styrene and atactic polypropylene. Accordingly, the method includes optional eleventh step (455) of blending the bio-based adhesive with asphalt, a sealant, or a polymer. Examples of a sealant include roof tars, silicone and polyurethane. Examples of polymers are: styrene-butadiene-styrene, and atactic polypropylene and accordingly the method includes optional twelfth step (460) wherein the polymer is selected from the group consisting of styrene-butadiene-styrene, and atactic polypropylene.

The adhesive derived from the methods disclosed is unique. It is an adhesive material derived from a disclosed method wherein the adhesive comprises renewable polymer from oil containing fatty acids and the powdered material. The adhesive is made from oil containing fatty acids; and, powdered material, preferably fly ash waste. This bio-based adhesive material is a new, renewable bio-based adhesive material that replaces petroleum asphalt and other petroleum based products used in building and paving industries.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

Industrial Applicability

The invention has application to the building and paving industries.

What is claimed is:

1. A method of making an adhesive material to replace asphalt in manufacturing roof shingles or pavement, the method comprising the steps of:
    forming a mixture by combining:
        oil comprising fatty acids; and
        a powdered material operable to catalyze polymerization of the oil;
    maintaining the oil-to-powdered-material weight ratio in the mixture between 1 to 0.01 and 1 to 4.9;
    polymerizing the oil and creating the adhesive by:
        heating the mixture to a reaction temperature greater than 100 degrees Centigrade; and maintaining the reaction temperature until the oil is polymerized; and injecting air into the mixture while polymerizing the oil.

2. A method of making a bio-based adhesive for a coating or to replace or serve as an additive for asphalt, sealant, or polymers in manufacturing building or paving materials, the method comprising the steps of:

forming a mixture by combining:
oil comprising fatty acids; and
a powdered material operable to catalyze polymerization of the oil;

maintaining the oil-to-powdered-material weight ratio in the mixture between 1 to 0.00001 and 1 to 20;

polymerizing the oil and creating the adhesive by:
heating the mixture to a reaction temperature greater than 55 degrees Centigrade; and
maintaining the reaction temperature until the oil is polymerized; and injecting air into the mixture while polymerizing the oil.

3. The method of claim 2, further comprising the steps of:
obtaining waste cooking oil; and
using the waste cooking oil as the oil in the mixture.

4. The method of claim 2, further comprising the step of selecting the powdered material from the group consisting of fly ash, sand, cement, limestone, clay, talc, mica, alumina oxide, dolomite, gypsum, wood flour, starch, and mixtures thereof.

5. The method of claim 2, further comprising the step of adding a catalyst to the mixture, the catalyst selected from the group consisting of cobalt, and an iron organic compound.

6. The method of claim 2, further comprising the step of obtaining the oil from a source selected from the group consisting of a plant, an alga, an animal fat, trap grease, a process of converting wood into wood pulp, and a process of destructive distillation from dried biomass.

7. The method of claim 2, wherein the reaction temperature is within a range of between about 130 degrees Centigrade and about 250 degrees Centigrade.

8. The method of claim 2, further comprising the step of maintaining the oil-to-powdered-material weight ratio between 1 to 0.01 and 1 to 4.9.

9. The method of claim 2, further comprising the steps of:
uniformly distributing the air in the mixture; and
maintaining an air to oil ratio in the mixture within a range of 0.01 to 2.0 liters of air per minute per gram of oil.

10. The method of claim 2, further comprising the step of stirring the mixture while polymerizing the oil.

11. The method of claim 2, wherein the step of injecting air into the mixture is performed by bubbling air into the mixture.

12. The method of claim 2, wherein the step of injecting air into the mixture is performed by rotating the mixture in a rotary drum.

13. The method of claim 2, further comprising the step of blending the bio-based adhesive with asphalt, a sealant, or a polymer.

14. The method of claim 13, wherein the polymer is selected from the group consisting of styrene-butadiene-styrene, and atactic polypropylene.

* * * * *